Aug. 18, 1942.   M. R. HARRIS   2,293,338
WELDING APPARATUS
Filed April 3, 1940
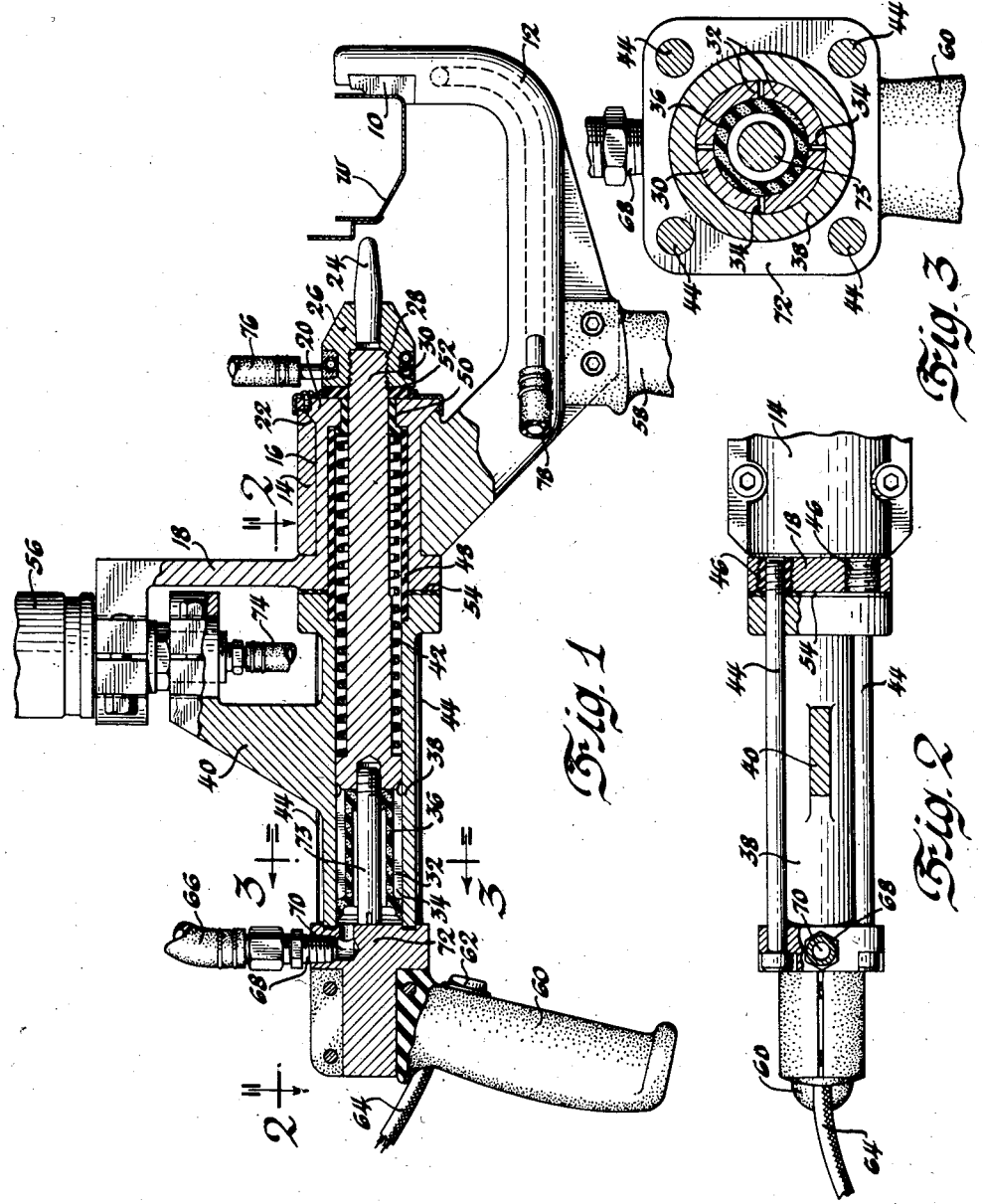
Inventor
Marcus R. Harris
By Blackmore, Spencer & Flint
Attorneys Patented Aug. 18, 1942

2,293,338

UNITED STATES PATENT OFFICE 2,293,338

WELDING APPARATUS

Marcus R. Harris, Indianapolis, Ind., assignor to General Motors Corporation, Detroit, Mich., a corporation of Delaware Application April 3, 1940, Serial No. 327,588

7 Claims. (Cl. 219—4)

This invention relates to welding apparatus and has particularly to do with electric resistance welding apparatus, especially spot welding apparatus.

Among the objects of my invention are the following: to provide improvements in, and simplification of, spot welding apparatus; to provide an improved and simplified spot welding apparatus of the portable type; to provide improvements in the electrical connections between movable parts of welding apparatus; and to provide a yoke type welding gun having a rotatable electrode support which is freely movable when the welding device is in non-welding position and which is in fixed and current carrying pressure relation with respect to other portions of the apparatus when a weld is being made.

Other objects and advantages of my invention will become more apparent from the detailed description which follows, reference here being made to the accompanying drawing forming a portion of this specification and illustrating an embodiment of my invention.

In the drawing:

Figure 1 is a plan view with parts broken away and in section of a spot welding apparatus in accordance with my invention.

Figure 2 is a view substantially on line 2—2 of Figure 1.

Figure 3 is a view on line 3—3 in Figure 1.

In the embodiment of my invention illustrated in the drawing is shown an electrode or anvil 10 in contact with work W to be welded. The electrode 10 is supported and carried by a yoke 12 of current conducting material having a portion 14 normally free to rotate about a cylindrical portion 16 of a support or body portion 18 also formed of current conducting material. At one end of the portion 16 is a flared portion 20 having a surface thereof contacting a mating portion of the yoke at 22. The mating surfaces of the two parts provide what may be described as "contact surfaces." As shown the flared portion is at an angle of 45° with respect to the axis of the cylindrical portion.

A second electrode 24 in alignment with the electrode 10 is removably fixed to, and carried by, a support 26 having screw-threaded engagement at 28 with a piston 30 having an expansible split-skirted portion formed by means of segments 32 separated by slots 34. Within the split skirt is a flexible walled member or sac 36 formed of Neoprene or other suitable material. The split skirt of the piston and a portion of the sac 36 slidably engage the walls of a cylinder 38 formed in a second support or body portion 40 secured to and electrically insulated from the body portion 18. The piston extends upwardly as viewed in Figure 1 through the cylinder portions 38 and 16, a coil spring 42 surrounding a portion of the piston that is of smaller diameter than the skirt and biasing the piston to the position shown in Figure 1 while the device is in non-welding position. As will be understood, the body member 40 and its cylindrical portion, the piston 30, and support 26, form a portion of the circuit leading to the electrode 24.

The frame or body portions 18 and 40 are secured together by four bolts 44, the screw-threaded end of each of the bolts being electrically insulated from the body portion 18 by insulators 46. Sleeve members 48 and 50 and washer-like members 52 and 54 complete the electrical insulation between the two portions of the body and the conducting parts in contact with each portion. Thus each body portion and the electrode and associated parts carried thereby are electrically insulated from the other body portion and its associated parts, the two body portions being supplied with welding current by a cable 56 including portions leading to opposite sides of the power supply.

Fixed to the yoke portion of the apparatus is a handle 58, shown in the drawing as being formed of a suitable non-conductor of electricity, while a second handle 60 is shown as being formed of a suitable non-conductor and as connected to one end of the frame portion 40. Since the welding voltages are ordinarily low it is not essential to form the handles of non-conducting materials.

A switch 62 mounted on the handle 60 is adapted to be closed by the operator to complete a control circuit by means of the conductors indicated generally at 64. The control (not shown) is adapted to actuate a device to admit fluid by means of line 66, connector 68, passage 70 in the cylinder head portion 72 to the cylinder to actuate the piston 30 and electrode carried thereby. Within the cylinder and secured to the piston at one end by means of a screw-threaded connection is a rod 73, the free end of which contacts the cylinder head.

In the specific embodiment shown in the drawings the welding electrodes and welding cable are cooled by means of a cooling fluid being caused to flow adjacent these parts. Portions of the pipe lines conducting the cooling medium to these parts are indicated at 74, 76 and 78.

The operation of the device may be briefly summarized as follows. The electrode 10 carried by the yoke portion 12 is moved by the operator to contact work to be welded. By means of the revolvable connection the yoke and electrode 10 only need be so moved. At this time no pressure is built up in the cylinder and the yoke is freely revolvable about the cylindrical portion of the upper body portion. The switch is thereafter closed to actuate a control means (not shown) to cause hydraulic pressure to be built up in the cylinder 38 below the skirt of the piston and within the sac or flexible walled member 36. This causes the piston to move and carry the electrode 24 into pressure engagement with the opposite side of the work to be welded. When the pressure on the work has been built up to a certain point the yoke portion 22 is forced to ride on the mating surface formed by the flared portion 20 of the body member 18 so that a pressure contact between these parts is formed at this point. At the same time the fluid pressure within the sac or flexible walled member expands the split skirt of the piston against the cylinder wall so that pressure contact occurs. After the moving parts are thus fixed in position the welding current is turned on in any convenient manner. For example, a back pressure switch (not shown) may be closed by pressure built up in the system to operate the welding circuit. A suitable timer (not shown) may be used to break the welding circuit before hydraulic pressure is released. When the hydraulic pressure is released the coil spring 42 returns the piston to the position shown in Figure 1. By means of the pressure contact between the split skirt of the piston and the cylinder wall, and the pressure contact between the yoke and body portion 18 arcing at these points is eliminated. The present design eliminates all shunts and jumpers required in other types of welding guns.

Various changes in the embodiment of my invention disclosed herein may be made without departing from the spirit and principle of my invention, and I do not intend to limit the patent granted for my invention except as necessitated by the prior art.

I claim:

1. In an electric welding apparatus; a yoke support formed of current conducting material and having a portion forming a contact surface; a yoke formed of current conducting material and having a portion forming a contact surface, said yoke being movably carried by the yoke support when the apparatus is in non-welding position and adapted to be in fixed relation with respect to the yoke support during a welding operation; a first electrode carried by said yoke; a second electrode; and means for moving said second electrode to apply pressure to the work to be welded and to move the contact surfaces of the yoke support and yoke relatively to each other after the pressure on the work has reached a certain value to provide a pressure contact between the contact surfaces of the yoke and yoke support so that the yoke and yoke support are in fixed and current conducting relation during a welding operation.

2. In an electric welding apparatus; a yoke support formed of current conducting material and having a portion forming a contact surface; a yoke formed of current conducting material and having a portion forming a contact surface, said yoke being mounted on said yoke support and freely rotatable thereon when the apparatus is in non-welding position and adapted to be in fixed relation with respect to the yoke support during a welding operation; a first electrode carried by the yoke; a second electrode; and means for moving said second electrode to apply pressure to work to be welded and to move the contact surfaces of the yoke support and yoke relatively to each other to provide a pressure contact between the contact surfaces of the yoke and yoke support so that the yoke and yoke support are in fixed and current conducting relation during a welding operation.

3. In an electric welding apparatus, a yoke support formed of current conducting material and having a portion forming a contact surface; a yoke formed of current conducting material and having a portion forming a contact surface, said yoke being normally rotatably carried by said yoke support; a first electrode carried by the yoke; a cylinder formed of current conducting material fixed to and electrically insulated from the yoke support; a piston formed of current conducting material and having an expansible skirt within said cylinder and being electrically insulated from the yoke support; a second electrode adapted to be moved by said piston; means to admit fluid to the cylinder to move the piston and electrode to apply pressure to work to be welded and to move the contact surfaces of the yoke and yoke support to provide a pressure contact between these surfaces of the yoke and yoke support so that the yoke support and yoke are in fixed and current conducting relation, the fluid pressure built up in the cylinder after reaching a certain value causing the expansible skirt of the piston to expand and firmly contact the cylinder wall; and means to supply welding current to said yoke support and cylinder.

4. In an electric welding apparatus, a yoke support formed of current conducting material having a cylindrical portion and a flared portion; a yoke formed of current conducting material having a portion normally rotatably mounted on the cylindrical portion and contacting the surface of the flared portion of the yoke support; a first electrode carried by the yoke; a body member formed of current conducting material and having a cylindrical portion in substantial alignment with the cylindrical portion of the yoke support; a piston formed of current conducting material within the aligned cylindrical portions and having an expansible split skirt engaging the cylinder walls of the body member; a second electrode adapted to be moved by the piston; a spring normally biasing the piston and second electrode to non-welding position; means for electrically insulating the yoke support from the body member and piston; means for admitting pressure fluid to the cylinder of the body member to move the piston and electrode against the pressure of the spring to apply pressure to work to be welded and to cause the flared portion of the yoke support to move with respect to the yoke to provide a pressure contact between these parts so that the yoke support and yoke are in fixed and current conducting relation, the fluid pressure built up in the system after reaching a certain value expanding the piston skirt to firmly contact the cylinder wall; and means to supply welding current to the yoke support and body member.

5. In an electric welding apparatus, a yoke support formed of current conducting material having a cylindrical portion and a flared portion; a yoke formed of current conducting material having a portion normally rotatably mounted on the cylindrical portion and contacting the surface of the flared portion of the yoke support; a first electrode carried by the yoke; a body member formed of current conducting material and having a cylindrical portion in substantial alignment with the cylindrical portion of the yoke support; a piston formed of current conducting material within the aligned cylindrical portions; a second electrode adapted to be moved by the piston; a spring normally biasing the piston and second electrode to non-welding position; means for electrically insulating the yoke support from the body member and piston; means for admitting pressure fluid to the cylinder of the body member to move the piston and electrode against the pressure of the spring to apply pressure to work to be welded and to cause the flared portion of the yoke support to move with respect to the yoke to provide a pressure contact between these parts so that the yoke support and yoke are in fixed and current conducting relation; and means to supply welding current to the yoke support and body member.

6. In an electric welding apparatus, a yoke support formed of current conducting material having a cylindrical portion and a flared portion; a yoke formed of current conducting material having a portion normally rotatably mounted on the cylindrical portion and contacting the surface of the flared portion of the yoke support; a first electrode carried by the yoke; a second electrode; and means to move the second electrode to apply pressure to work to be welded and to cause the flared portion of the yoke support to move with respect to the yoke to provide a pressure contact between these parts so that the yoke support and yoke are in fixed and current conducting relation during a welding operation.

7. In an electric welding apparatus; a yoke formed of current conducting material; a first electrode carried thereby; a cylinder formed of current conducting material and electrically insulated from the yoke; a piston within the cylinder formed of current conducting material and having an expansible skirt; a second electrode carried by said piston; a flexible-walled sac within the expansible skirt of the piston; means to admit fluid pressure to the cylinder and within the flexible-walled sac to move the electrode into contact with the work and to thereafter press the expansible skirt of the piston into firm contact with the cylinder wall; and means to supply welding current to the yoke and cylinder.

MARCUS R. HARRIS.